United States Patent
Maeda et al.

(10) Patent No.: US 12,194,879 B2
(45) Date of Patent: Jan. 14, 2025

(54) SYSTEMS AND METHODS FOR FLEXIBLE CHARGER RESERVATIONS

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 527 days.

(21) Appl. No.: 17/396,610

(22) Filed: Aug. 6, 2021

(65) Prior Publication Data

US 2023/0039307 A1     Feb. 9, 2023

(51) Int. Cl.
*B60L 53/66*   (2019.01)
*B60L 53/63*   (2019.01)
(Continued)

(52) U.S. Cl.
CPC .............. *B60L 53/66* (2019.02); *B60L 53/63* (2019.02); *B60L 53/64* (2019.02); *B60L 53/665* (2019.02);
(Continued)

(58) Field of Classification Search
CPC ........ B60L 53/665; B60L 53/63; B60L 53/64; B60L 53/68; B60L 2240/72;
(Continued)

(56) References Cited

U.S. PATENT DOCUMENTS

| 9,024,580 B2 | 5/2015 | Wu et al. |
| 9,317,086 B2 | 4/2016 | Sellschopp |

(Continued)

FOREIGN PATENT DOCUMENTS

| CN | 107025730 | 8/2017 |
| CN | 107199905 | 9/2017 |

(Continued)

OTHER PUBLICATIONS

Office Action U.S. Appl. No. 17/396,606 dated Dec. 22, 2023, 20 pages.

(Continued)

*Primary Examiner* — Richard Isla
*Assistant Examiner* — Johali A Torres Ruiz
(74) *Attorney, Agent, or Firm* — RANKIN, HILL & CLARK LLP (57) ABSTRACT

Systems and methods for flexible charger reservations are provided. In one embodiment, a method includes providing, from a charging entity, a user a flexible charger option for charging an electric vehicle at a first place at a first time. The flexible charger option is associated with a flexible charger compensation offer including a user benefit. The method includes generating an initial reservation for the user at the first place and the first time. The initial reservation is associated with a first cost for the charging entity. The method includes providing the user with the user benefit in response to the user selecting the flexible charger option. The method includes detecting a grid event that changes the first cost for the charging entity. The method includes generating a revised reservation for the electric vehicle associated with a second cost for the charging entity that is less than the first cost.

17 Claims, 4 Drawing Sheets

(51) Int. Cl.
*B60L 53/64* (2019.01)
*G06Q 10/02* (2012.01)
*G06Q 50/40* (2024.01)
*H04W 4/44* (2018.01)

(52) U.S. Cl.
CPC ............ *G06Q 10/02* (2013.01); *G06Q 50/40* (2024.01); *H04W 4/44* (2018.02)

(58) Field of Classification Search
CPC . B60L 2260/52; B60L 2260/54; G06Q 10/02; G06Q 50/40; H04W 4/44; Y02T 10/70; Y02T 10/7072; Y02T 90/12
See application file for complete search history.

(56) References Cited

U.S. PATENT DOCUMENTS

| | | |
|---|---|---|
| 9,796,286 B2 | 10/2017 | Atluri et al. |
| 10,126,796 B2 | 11/2018 | Dorn et al. |
| 10,872,361 B2 | 12/2020 | Khoo et al. |
| 10,953,765 B1 | 3/2021 | Sun et al. |
| 2010/0156349 A1 | 6/2010 | Littrell |
| 2011/0202217 A1 | 8/2011 | Kempton |
| 2012/0268061 A1 | 10/2012 | Bhageria et al. |
| 2013/0211988 A1 | 8/2013 | Dorn et al. |
| 2013/0339108 A1 | 12/2013 | Ryder et al. |
| 2014/0184170 A1 | 7/2014 | Jeong |
| 2015/0137753 A1 | 5/2015 | Cha et al. |
| 2015/0298565 A1 | 10/2015 | Iwamura et al. |
| 2015/0367740 A1 | 12/2015 | McGrath et al. |
| 2018/0189900 A1 | 7/2018 | Díaz et al. |
| 2019/0160958 A1* | 5/2019 | Chaudhary ............ B60L 53/665 |
| 2019/0308510 A1* | 10/2019 | Beaurepaire ........... B60K 35/60 |
| 2019/0351783 A1 | 11/2019 | Goei |
| 2020/0156494 A1* | 5/2020 | Niikawa ................. B60L 50/60 |
| 2021/0039508 A1* | 2/2021 | Pan ......................... B60L 53/16 |
| 2021/0065073 A1 | 3/2021 | Maeda et al. |
| 2021/0088992 A1* | 3/2021 | Lee ....................... G05B 19/042 |
| 2021/0221243 A1* | 7/2021 | Kawamoto ........... H01M 10/48 |

FOREIGN PATENT DOCUMENTS

| | | |
|---|---|---|
| CN | 107248225 | 10/2017 |
| CN | 107346452 | 11/2017 |
| CN | 108198342 | 6/2018 |
| CN | 108749611 | 11/2018 |
| FR | 2977088 B1 | 3/2018 |
| JP | 2010230615 | 10/2010 |
| WO | WO2020120095 | 6/2020 |

OTHER PUBLICATIONS

Office Action U.S. Appl. No. 17/396,606 dated Jul. 30, 2024, 13 pages.
Office Action U.S. Appl. No. 17/396,606 dated Mar. 28, 2024, 10 pages.
Notice of Allowance U.S. Appl. No. 17/396,606 dated Oct. 15, 2024, 17 pages.

* cited by examiner

SYSTEMS AND METHODS FOR FLEXIBLE CHARGER RESERVATIONS

RELATED APPLICATIONS

The present application is related to co-pending application entitled SYSTEMS AND METHODS FOR DYNAMIC CHARGER RESERVATIONS, filed on the same date as the present application. The co-pending application is incorporated herein by reference, but is not admitted to be prior art with respect to the present application.

BACKGROUND

Electric vehicles contain electric storage mechanisms (e.g., electric engines powered by rechargeable batteries) to store electricity and power the electric vehicles. The electric storage mechanisms may be replenished periodically by using, for example, charging equipment installed at public or private charging stations. To manage users' access, users may make reservations for their electric vehicle to charge at a specific time. However, circumstances may make charging the electric vehicle at the reserved time unfeasible. Accordingly, it may be desirable to change the reserved time.

BRIEF DESCRIPTION

According to one aspect, a computer-implemented method for providing flexible charger reservations is provided. In one embodiment, the computer-implemented method includes providing, from a charging entity, a user a flexible charger option for charging an electric vehicle at a first place at a first time. The flexible charger option is associated with a flexible charger compensation offer including a user benefit. The computer-implemented method also includes generating an initial reservation for the user at the first place and the first time. The initial reservation is associated with a first cost for the charging entity. The computer-implemented method further includes providing the user with the user benefit in response to the user selecting the flexible charger option. The computer-implemented method yet further includes detecting a grid event that changes the first cost for the charging entity. The computer-implemented method includes generating a revised reservation for the electric vehicle. The revised reservation is associated with a second cost for the charging entity that is less than the first cost. The revised reservation is then provided to the user.

According to another aspect, a system for flexible charger reservations that includes a memory storing instructions when executed by a processor cause the processor to provide, from a charging entity, a user a flexible charger option for charging an electric vehicle at a first place at a first time. The flexible charger option is associated with a flexible charger compensation offer including a user benefit. The instructions also cause the processor to generate an initial reservation for the user at the first place and the first time. The initial reservation is associated with a first cost for the charging entity. The instructions further cause the processor to provide the user with the user benefit in response to the user selecting the flexible charger option. The instructions yet further cause the processor to detect a grid event that changes the first cost for the charging entity. The instructions cause the processor to generate a revised reservation for the electric vehicle. The revised reservation is associated with a second cost for the charging entity that is less than the first cost. The instructions also cause the processor to provide the revised reservation to the user.

According to still another aspect, a non-transitory computer readable storage medium storing instructions that when executed by a computer, which includes a processor perform a method is provided. The method includes providing, from a charging entity, a user a flexible charger option for charging an electric vehicle at a first place at a first time. The flexible charger option is associated with a flexible charger compensation offer including a user benefit. The method also includes generating an initial reservation for the user at the first place and the first time. The initial reservation is associated with a first cost for the charging entity. The method further includes providing the user with the user benefit in response to the user selecting the flexible charger option. The method yet further includes detecting a grid event that changes the first cost for the charging entity. The method includes generating a revised reservation for the electric vehicle. The revised reservation is associated with a second cost for the charging entity that is less than the first cost. The revised reservation is then provided to the user.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The systems and methods herein are directed to providing flexible charger reservations that can be altered by a charging entity. For example, suppose that the user is provided a flexible charger option with the initial reservation for charging an electric vehicle at a first place at a first time. When selected by the user, the flexible charger option indicates to the charging entity that the user will accept changes to the initial reservation, thereby giving the charging entity consent to unilaterally alter the initial reservation to a revised reservation. In some embodiments, the charging entity may automatically modify the initial reservation to generate a revised reservation when a grid event is detected.

Suppose the charging entity wishes to change the initial reservation in response to a grid event. For example, the charging entity may wish to reduce load on the electrical grid and/or save money by not providing a charge to the electrical vehicle at the first time. Therefore, the charging entity may generate a revised reservation for the electric vehicle that modifies the initial reservation. For example, the revised reservation may alter the first time to a second time and/or a first place to a second place. The revised reservation is associated with a second cost for the charging entity that is less than the first cost so that the charging entity is incentivized to modify the initial reservation. If the user has selected the flexible charger option, the charging entity can revise the initial reservation without input from the user. When the initial reservation is modified to the revised reservation, the charging entity provides the revised reservation to the user. Because the user selected the flexible charger option at the reservation time, the charging entity does not ask the user for consent before modifying the initial reservation to the revised reservation. Furthermore, charging entity may proliferate the change through the user's scheduling services. For example, the charging entity may automatically update the user's calendar.

To incentivize the user to select the flexible charger option when the initial reservation is made (i.e., the reservation time), the user is provided with a flexible charger compensation offer including a user benefit. The flexible charger compensation offer defines the user benefit for selecting the flexible charger option at the reservation time. For example, the user benefit may be a reduced charging fee for charging the electric vehicle or discounted wifi while charging the electric vehicle. In another embodiment, the user benefit may an immediate benefit that the user can utilize before charging the electric vehicle. For example, the user benefit may be coupon, discount, gift card, tickets, etc. Accordingly, the user may receive the user benefit at the reservation time in response to selecting the flexible charger option.

The systems and methods may also calculate how power is reduced by revising the initial reservation. In one embodiment, the charging entity may try to manage demand on the grid by managing charger reservations thereby making the charger reservations flexible. This can reduce stress on the infrastructure caused by high demand. In another embodiment, the charging entity can better manage the cost of charging vehicles. For example, the charging entity can prioritize higher profit reservations. Giving charging entities the ability to make charger reservations flexible, such that reservations can be altered, may improve the functioning of the electrical grid and infrastructure and improve the business model of the charging entity.

Definitions

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

A "user" is an entity associated at least one rechargeable electric vehicle. For example, the user may be one or more human occupants carried by the electric vehicle. In another embodiment, the user may be an entity tasked with maintaining one or more electric vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
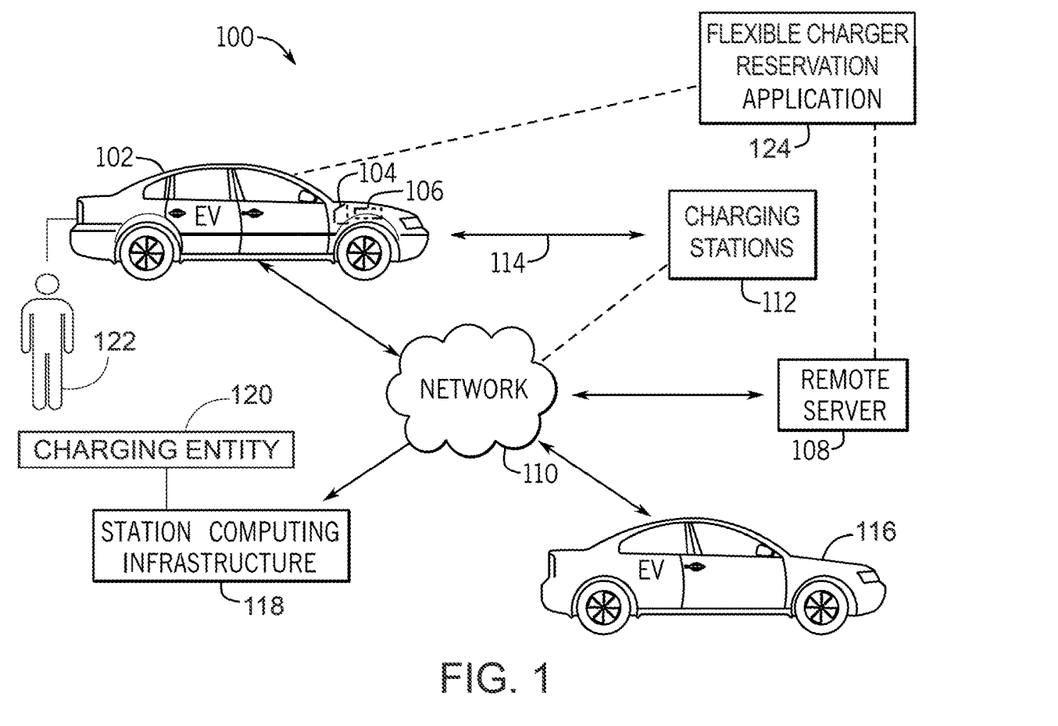
FIG. 1 is a high-level schematic view of an illustrative system for flexible charger reservations according to an exemplary embodiment.

Referring now to the drawings, wherein the showings are for purposes of illustrating one or more exemplary embodiments and not for purposes of limiting same, FIG. 1 is a high-level schematic view of an illustrative system 100 for flexible charger reservations according to an exemplary embodiment. The components of the system 100, as well as the components of other systems and architectures discussed herein, may be combined, omitted or organized into different architectures for various embodiments.

In the exemplary embodiment of FIG. 1, the system 100 includes an electric vehicle (EV) 102 powered by an electric motor 104 and an electric storage mechanism, for example, a battery 106. In one embodiment, the EV 102 is purely electric in that it only has the electric motor 104. In other embodiments, the EV 102 may have the electric motor 104 and an internal combustion engine (not shown). In some embodiments, the EV 102 may have any number of electric motors, batteries, and/or internal combustion engines and they may operate in series (e.g., as in an extended range electric vehicle), in parallel, or some combination of series and parallel operation.

The EV 102 may be operably connected for computer communication to a remote server 108 via a wireless communication network 110. The EV 102 may transmit and receive data (e.g., state of charge data, energy cost data, charging commands/signals) to and from the remote server 108, and vice versa, through the network 110. The remote server 108 may be a remote computing system or a device remote (e.g., off-board) from the EV 102. In some embodiments, the remote server 108 may provide scheduling services for the user 122. The system architectures of the EV 102 and the remote server 108 will be discussed in more detail herein with regard to FIG. 2, FIG. 3, and FIG. 4.

In the exemplary embodiment of FIG. 1, the system 100 may include one or more charging stations 112 that may connect to the EV 102 via a (respective) charging link 114. The charging stations 112 may include charging equipment (not shown) that may replenish the battery 106 of the EV 102 with charging power. The charging stations 112 may be grouped in one geographic location or spread out over a plurality of geographic locations, as will be discussed with regard to FIG. 5.

Additionally, in some embodiments, the charging stations 112 may be operably connected for computer communication with the EV 102 and/or the remote server 108, for example, to transmit and receive data (e.g., charge parameters, charging data and feedback, vehicle system data) to and from the EV 102 and/or the remote server 108. The charging link 114 may be a wired or wireless link to the charging stations 112. Computer communication may occur also via the charging link 114 and/or a wired or wireless communication link. In one embodiment, the EV 102, the charging stations 112 and/or the charging link 114 may be operably controlled to initiate or terminate charging of the EV 102 from the charging stations 112 based on one or more charging schedules that are implemented within the system 100.

In one or more embodiments, the charging stations 112 may include charging equipment that may be installed at a residential home or outside a residential home, for example, at a public (e.g., non-networked) or private (e.g., networked) charging stations. The charging stations 112 may include a charging station identification designation (e.g., identification number, serial number, alpha-numeric code, station name) that may be used to identify particular charging stations 112. The charging stations 112 may replenish the battery 106 using a charging energy source type that indicates the type of energy the charging stations 112 provides. Energy may include clean renewable energy and non-renewable energy. Clean renewable energy may include, solar energy, hydro energy, biomass energy, wind energy, among others. Non-renewable energy may include electricity from a grid source, and in the case of hybrid vehicles, fossil fuels. Energy may be provided from one or more energy providers (not shown) such as utility providers, power plants, etc.

In one or more embodiments, the EV 102 may be configured to output charging power to one or more additional electric vehicles 116 that may be physically linked via a vehicle to vehicle charging link (e.g., physical wired link, wireless link) (not shown) with the EV 102. The EV 102 may also be configured to receive charging power to charge the battery 106 of the EV 102 from one or more additional electric vehicles 116 that may be linked via the vehicle to vehicle charging link with the EV 102. Accordingly, the EV 102 and/or the one or more additional electric vehicles 116 may be configured to complete vehicle to vehicle wireless and/or wireline charging that may be completed in real-time without utilization of the charging stations 112.

In one or more configurations, the EV 102 may be configured of being capable of being fast charged based on fast charging components (not shown) that may be operably connected to the battery 106 and/or that may be included as part of the battery 106. Fast charging may enable the EV 102 to be charged at a faster charging speed (e.g., than a default charging speed) when being charged by a fast charging electric charging equipment (not shown) that may be included at the charging stations 112. In particular, fast charging may provide a higher charging voltage from a default/conventional charging voltage (e.g., increase from 240 volts to 480 volts) to more quickly charge the battery 106 of the EV 102. Accordingly, during utilization of fast charging the battery 106 of the EV 102 may be more quickly charged to a particular state of charge level than during the utilization of a conventional electric vehicle charging speed. The charging stations 112 may thereby provide a particular charging rate structure that may pertain to the utilization of the conventional electric vehicle charging speed. Additionally, the charging stations 112 may provide a particular charging rate structure that may pertain to the utilization of the fast electric vehicle charging speed.

In an exemplary embodiment, the EV 102, the charging stations 112, the additional electric vehicles 116, and/or the remote server 108 may receive and transmit data through the network 110 to a charging station computing infrastructure 118. The charging station computing infrastructure 118 may include one or more computing devices (not shown) that may communicate with one or more charging entities 120 (e.g., charging station corporate owner) that may include utility providers, fuel providers, and/or entities that own and/or operate one or more various types of charging stations, fuel stations, energy stations, and the like.

In one embodiment, the charging station computing infrastructure 118 may receive perspective and/or real-time price data that may be provided by each respective charging stations 112 to communicate different charging rates. The perspective and/or real-time price data may include charging rates during a certain period of time (e.g., hourly, daily, weekly), charging rates to charge the EV 102 at various charging speeds (e.g., conventional electric vehicle charging speed, fast electric vehicle charging speed, charging power levels), charging rates that may be based on a customer rating that may be applied to a user 122 associated with the EV 102, and/or charging rates that may be applied to the user 122 of the EV 102 based on one or more compensation offers (e.g., incentives, discounts, credits, etc.) that may be provided to the user 122.

In some embodiments, the charging station computing infrastructure 118 may determine a price per kilowatt-hour of energy (price per kWh) that may be communicated to the EV 102, the remote server 108, and/or the charging stations 112 based on utility rates that are received from the one or more energy providers. The price per kWh may include a dynamic value that may change over time based on a time of day, a season, a region, a time zone, etc. For example, each hour of a particular day may include a different price per kWh based on one or more pricing schemes that are implemented by the one or more energy providers. The price per kWh may be incurred by the charging entity 120. As one example, the energy provider may invoice the charging entity 120 for the total amount of energy consumed by the charging stations 112. The charging entity 120 may pass the cost to the user 122 by invoicing the user 122 for the cost to charge the EV 102.

In an exemplary embodiment, the system 100 may include a flexible charger reservation application 124 that may provide various types of enhancements that may be applicable to the charging of the EV 102 and additional electric vehicles 116. In an exemplary embodiment, the flexible charger reservation application 124 may be executed by the EV 102 (e.g., a processor, an electronic control unit), the remote server 108 (e.g., a processor), and/or the charging station computing infrastructure 118 (e.g., a processor). The flexible charger reservation application 124 may include various modules and/or logic (not shown) to alter reservations made by a user 122 of the EV 102 and provide compensation offers. In particular, the flexible charger reservation application 124 may be configured to receive a reservation request including a flexible charging option, detect a grid event, generate a revised reservation based on the initial reservation by altering an existing reservation to a different time and/or different location, generate a compensation offer for the user 122 that includes a user benefit, and/or provide the revised reservation to the user 122.

Figure 2:
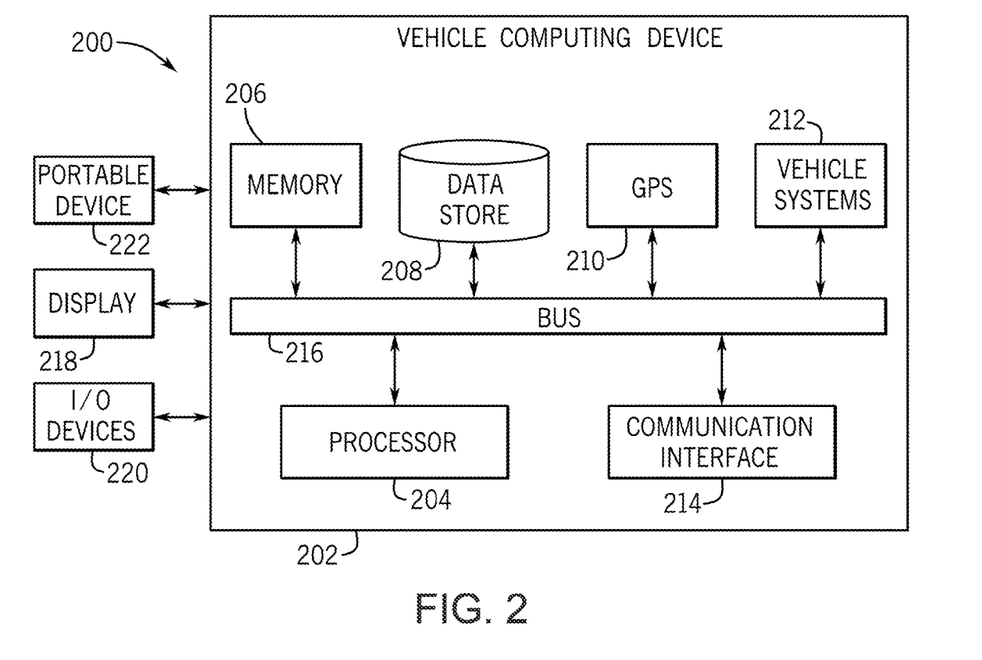
FIG. 2 is a schematic view of an illustrative electric vehicle architecture according to an exemplary embodiment.

Referring now to FIG. 2, a schematic view of an illustrative electric vehicle architecture 200, for example the EV 102 of FIG. 1, is shown according to an exemplary embodiment. In particular, the EV 102 may include a vehicle computing device 202 (e.g., a telematics unit, an electronic control unit) with provisions for processing, communicating and interacting with various components of the EV 102 and other components of the system 100. The vehicle computing device 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV 102 may include other components and systems not shown.

The communication interface 214 of the EV 102 may provide software, firmware and/or hardware to facilitate data input and output between the components of the vehicle computing device 202 and other components, networks and data sources. Further, the communication interface 214 may facilitate communication with a display 218 (e.g., head unit display, head up display, dash board display) in the EV 102 and other input/output devices 220, for example, a portable device 222 (e.g., key fob, smart phone) connected to the EV 102.

In some embodiments the portable device 222 may include some or all of the components and functionality of the vehicle computing device 202. Additionally, the communication interface 214 may facilitate communication between the EV 102 and the portable device 222 that may include a display 218 and/or input/output devices (not shown) be used to operate various functions of the EV 102. In one embodiment, the display 218 of the EV 102 and/or the portable device 222 (e.g., through a display screen of the portable device 222) may be utilized to provide one or more user interfaces that may be included as a human machine interface(s) of the flexible charger reservation application 124.

Figure 3:
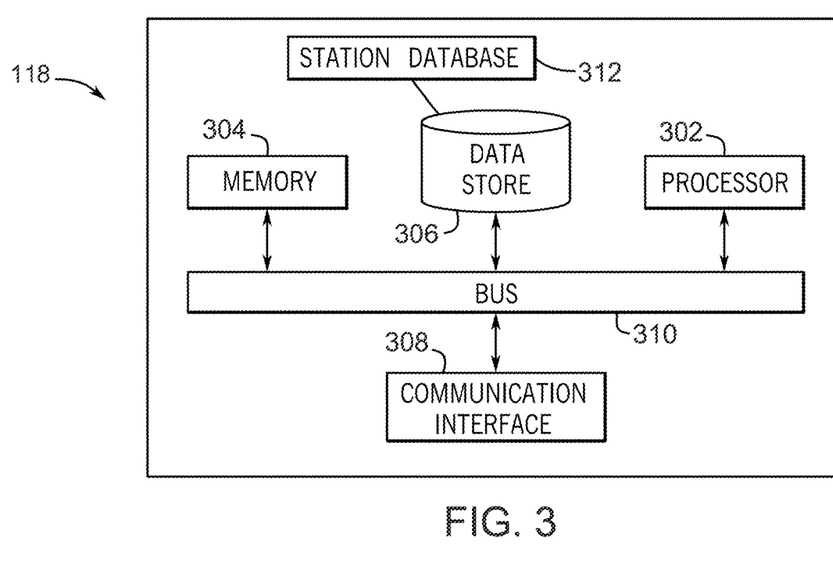
FIG. 3 is a schematic view of an illustrative remote server architecture according to an exemplary embodiment.

Referring now to FIG. 3, a schematic view of an illustrative charging station computing infrastructure 118, for the charging station computing infrastructure 118 or alternatively the remote server 108 of FIG. 1, is shown according to an exemplary embodiment. The charging station computing infrastructure 118, is located remotely (i.e., off-board) from the EV 102 (as shown in FIG. 1). In some embodiments, the charging station computing infrastructure 118 may be maintained by the charging entity 120, such as an Original Equipment Manufacturer (OEM) (e.g., of the EV 102), a utility provider, a regulatory body, among others. In additional embodiments, the charging station computing infrastructure 118 may be another type of remote device or supported by a cloud architecture. In FIG. 3, the charging station computing infrastructure 118 has a station computing infrastructure 118 that may include a processor 302, a memory 304, a data store 306 and a communication interface 308. The components of the charging station computing infrastructure 118 may be operably connected for computer communication via a bus 310 and/or other wired and wireless technologies. The charging station computing infrastructure 118 as well as the remote server 108 may include other components and systems not shown.

The data store 306 may store application data that may also include data pertaining to the flexible charger reservation application 124. In one configuration, the data store 306 may include a user dataset (not shown) that may include data pertaining to users of electric vehicles (including the user 122 of the EV 102) that may utilize the charging stations 112. In one configuration, the user dataset may include a charging schedule that may be associated with the EV 102 utilized by the user 122. The charging schedule may include the scheduled use of a charging station 112 including users, reservation timing (e.g., expected arrival, actual arrival, expected departure, etc.), charging data (e.g., expected energy use, current charge status), cost (e.g., invoicing from third party entities, invoices for user, energy pricing history, current energy pricing, etc.), and/or location, among others.

The flexible charger reservation application 124 may allow the user 122 and/or the charging entity 120 to update the charging schedule associated with the EV 102 and/or additional electric vehicles 116 that may utilize one or more charging stations 112. Updating the charging schedule may include revising and cancelling reservations made by a user 122 for the EV 102. The user dataset may also include a history of compensation offers and whether the user 122 accepted or declined the compensations offers determined by the flexible charger reservation application 124 and/or one or more charging entities 120 that may be provided based on one or more factors.

In one configuration, the data store 306 may include a station database 312 that may include respective records of charging stations 112 that may be owned and/or operated by the charging entity 120. The station database 312 may include records that each pertain to particular charging stations 112 that include data that may be pre-updated and/or updated in real-time by the charging entity 120. In one configuration, the station database 312 may include records that may pertain to particular charging stations 112 and their respective geo-locations (GPS/DGPS coordinates of the charging stations 112).

The station database 312 may also include records that may pertain to one or more particular charging stations 112 and one or more pricing schemes that may be implemented by the respective charging stations 112. The one or more pricing schemes may include a price per kWh that may include a flexible value that may change over time based on a time of day, a season, a region, a time zone, charging power requirements, a charging speed, charging queue place, customer incentives, etc. For example, each hour of a particular day may include a different price per kWh based on one or more pricing schemes that are implemented by the one or more energy providers. Additionally, the one or more pricing schemes may include price per kWh that may be influenced based on a respective user 122 and/or additional factors including, but not limited to, purchase of goods and/or services from the charging entity 120 and/or additional retailers/service providers. In some embodiments, the station database 312 may also include records that pertain to particular charging stations 112 and current utilization of the charging stations 112. The current utilization of the charging stations 112 may pertain to wait times that may be applicable with respect to the charging of the EV 102.

In one configuration, the communication interface 308 may provide software, firmware and/or hardware to facilitate data input and output between the components of the processor 302 and other components, networks and data sources. In some embodiments, the communication interface 308 may be used to communicate with the EV 102, the charging stations 112, the portable device 222, additional electric vehicles 116, and/or other components of system 100 and the electric vehicle architecture 200.

II. Methods for Providing Flexible Charger Reservations

With respect to FIG. 4, the flexible charger reservation application 124 and its components will now be discussed in more detail according to an exemplary embodiment and with continued reference to FIGS. 1-3 and 5. In one or more embodiments, the flexible charger reservation application 124 may be executed by the station computing infrastructure architecture 118 of the station computing infrastructure 118 or alternatively the remote server 108. The flexible charger reservation application 124 may be executed by the processor 204 of the vehicle computing device 200. In an alternate embodiment, the flexible charger reservation application 124 may be executed by a processor (not shown) of the portable device 222. For example, a system for flexible charger reservations may be performed by the flexible charger reservation application 124 via the memory 304 storing instructions executed by the processor 302.

In one or more configurations, data may be sent or received from the flexible charger reservation application 124 to the components of the EV 102, the remote server 108, the charging stations 112, the charging link 114, the charging entity 120, the portable device 222, and/or the additional electric vehicles 116. For example, commands from the flexible charger reservation application 124 may be sent to the charging stations 112 and/or the charging link 114 to initiate or terminate charging of the EV 102 during one or more periods of time based on the one or more factors and/or the one or more charging schedules.

In an exemplary embodiment, the flexible charger reservation application 124 may include one or more user input interfaces and/or input means (e.g., buttons) that may be presented via the display 218, presented via the portable device 222, and or included within the EV 102 and/or on the portable device 222. In one embodiment, the one or more user input interfaces and/or input means may include user interface inputs that may be utilized by an individual (e.g., the user 122 of the EV 102) to enable or disable the presentation of one or more user interface graphics that may be presented by the flexible charger reservation application 124. Additionally, the one or more user input interfaces and/or input means may include user interface inputs that may be utilized by the charging entity 120 or the user 122 to enable or disable one or more smart charging functions provided by the flexible charger reservation application 124. For example, the user 122 may select the flexible charger option via the one or more user input interfaces and/or input means.

Figure 4:
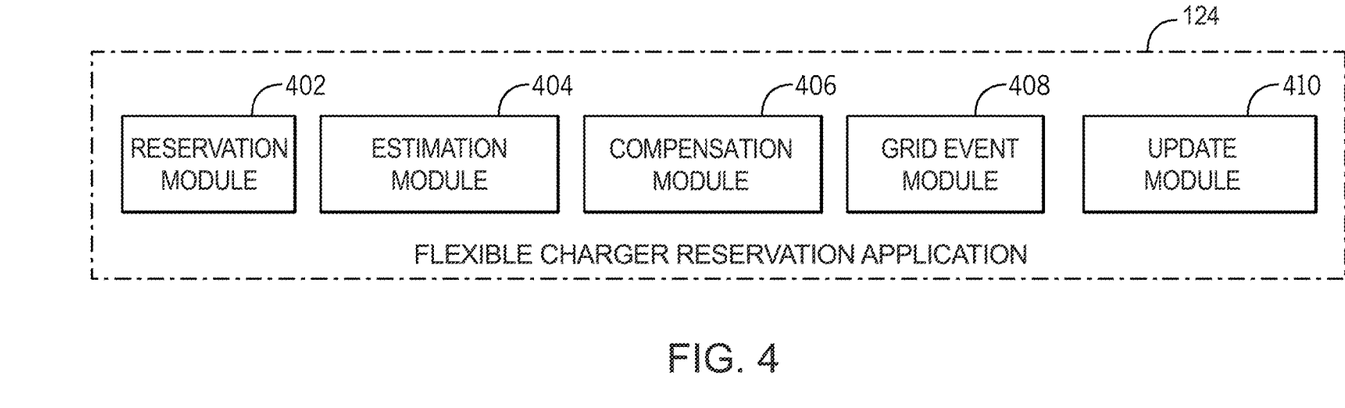
FIG. 4 is a schematic view of a plurality of modules of a flexible charger reservation application that may execute computer-implemented instructions according to an exemplary embodiment.

FIG. 4 is a schematic view of a plurality of modules 402-410 of the flexible charger reservation application 124 that may execute computer-implemented instructions for providing flexible charger reservations according to an exemplary embodiment. In one embodiment, the plurality of modules 402-410 may include a reservation module 402, an estimation module 404, a compensation module 406, a grid event module 408, and an update module 410. It is appreciated that the flexible charger reservation application 124 may include one or more additional modules and/or sub-modules that are included in addition to and/or in lieu of the modules 402-410. The plurality of modules 402-410 may be modules of a processor, such as the processor 204 or 302. The plurality of module 402-410 may receive instructions from a memory, such as the memory 206 or 304.

The reservation module 402 is configured to identify, manage, and/or modify reservations for the charging entity 120. For example, the reservation module 402 may provide a user a flexible charger option for charging an electric vehicle at a first place at a first time. Suppose that the user 122 would like to schedule a time to charge EV 102 at the charging station 112 operated by the charging entity 120. The user 122 may select the first place and/or the first time from a listing available on the display 218 and/or input/output devices.

Figure 5:
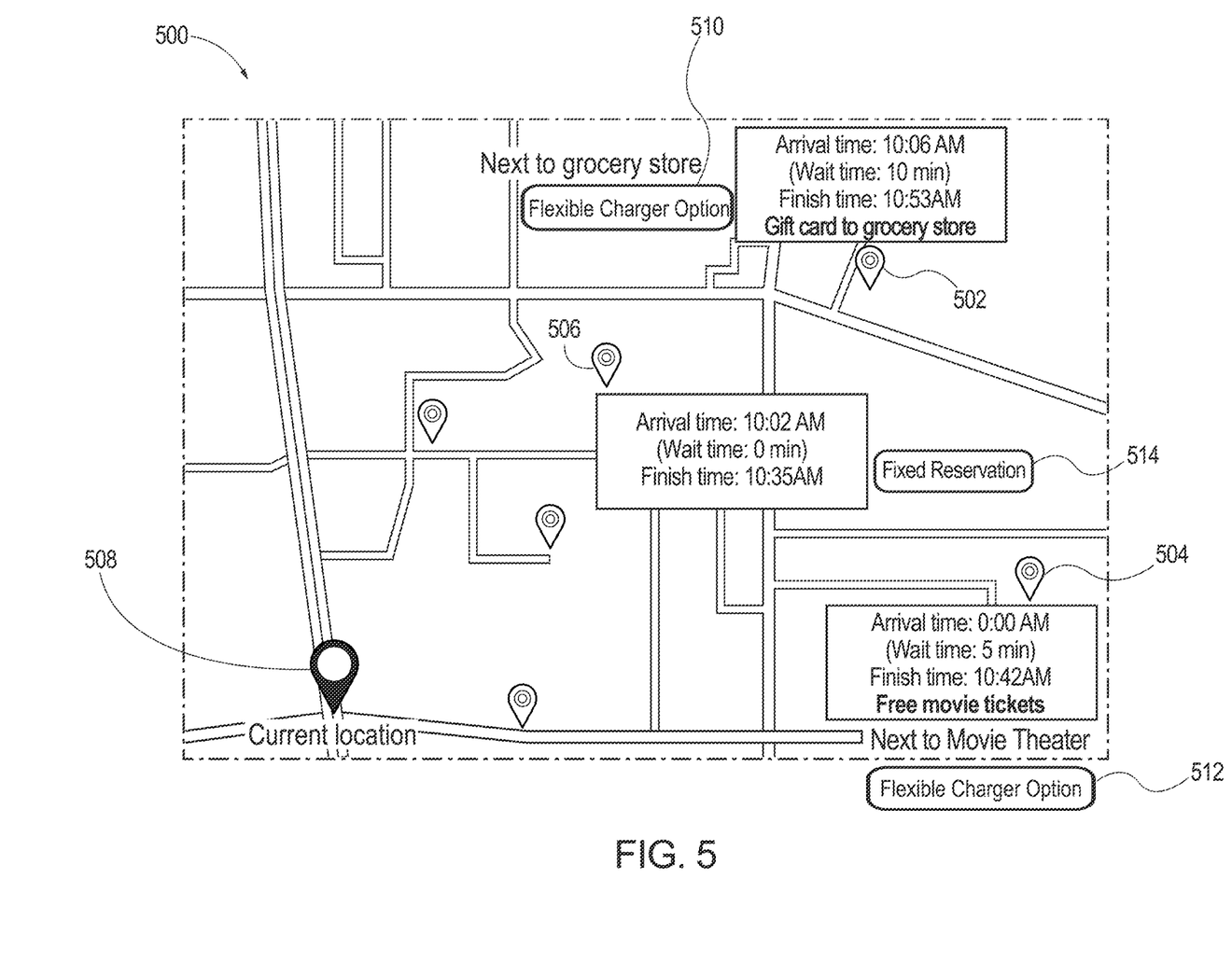
FIG. 5 is an illustrative example of a charging station map user interface according to an exemplary embodiment.

Turning to FIG. 5, the user 122 may use a charging station map user interface 500 to make an initial reservation at the reservation time. The charging station map user interface 500 may be presented through the display 218 of the EV 102 and/or a display of the portable device 222. In some embodiments, the charging station map user interface 500 may be presented in two-dimensional format (as shown in FIG. 5). In additional configurations, the charging station map user interface 500 may be converted to a three-dimensional format, a street-view format, a first-person point of view format, a satellite view format, and the like based on the receipt of a respective user interface input.

The charging station map user interface 500 may present the user 122 with candidate reservations, such as a first candidate reservation 502, a second candidate reservation 504, and a third candidate reservation 506. The candidate reservations 502, 504, and 506 may also include reservation information such as the arrival time, wait time before charging, and a finish time. For example, the first candidate reservation 502 may begin at 10:06 AM with a ten-minute wait and have expected finish time of 10:35 AM. It will be appreciated that while three candidate reservations are described more or fewer may be generated by the reservation module 402.

The first time may be a time for the EV 102 to arrive at the first place to receive a charge. The first time may be the time the EV 102 is expected to start charging after a wait time. For example, at times when the charging station 112 is servicing a number of users, the user 122 may have to wait before charging. The first time may the time at which the user 122 can expect to start charging after waiting. In another embodiment, the first time may be a duration corresponding to the length of time that the EV 102 is expected to be charging. For example, suppose the EV 102 is scheduled to begin charging at 10:02 AM. Based on the SOC, it may be determined that the EV 102 will charge for approximately 40 minutes. Accordingly, the first time may be a duration from 10:02 AM to 10:42 AM.

The candidate reservations 502, 504, and 506 may include the first place as a location associated with respective charging stations 112 where the user 122 can charge the EV 102. For example, in the charging station map user interface 500 the location of the first place is illustrated. In an alternative embodiment, the first place may be identified with an address, coordinates, directions, point of interest. In some embodiments, a region may be identified having a number of charging locations. The candidate reservations 502, 504, and 506 may be associated with a place. In response to the place being selected, the reservation module 402 may provide a number of available times.

The charging station map user interface 500 may pinpoint one or more perspective geo-locations of the candidate reservations 502, 504, and 506 relative to a current geo-location 508 of the EV 102 on the charging station map user interface 500. In another embodiment, the candidate reservations 502, 504, and 506 may be generated by the reservation module 402 at geo-location(s) of one or more charging stations 112 that may be located within the predetermined distance of the EV 102, within a predetermined distance of one or more perspective pathways of the EV 102, near one or more points of interest at which one or more routine activities may take place, and/or at one or more locations at which the EV 102 may need to be charged to maintain a sufficient SOC to be utilized complete one or more remaining routine activities and/or non-routine activities.

An estimation module 404 estimates current and future values based on data received from the EV 102, the charging stations 112, the additional electric vehicles 116, the remote server 108 and/or the charging station computing infrastructure 118. For example, the estimation module 404 of the flexible charger reservation application 124 may be configured to determine the current geo-location 508 of the EV 102 (e.g., current GPS/DGPS coordinates of the EV 102). In particular, the estimation module 404 may be configured to communicate with the GPS 210 of the EV 102 to determine the current geo-location 508 of the EV 102 at one or more points in time. In some embodiments, the estimation module 404 may be configured to store the one or more geo-locations of the EV 102 determined at one or more points in time within the data store 208 of the vehicle computing device 202 and/or the data store 306 of the remote server 108.

In some embodiments, the one or more travel routines may be analyzed through a neural network (not shown) to provide computer/machine based/deep learning techniques to determine whether a particular trip of the EV 102 is a routine trip or non-routine trip based on the analysis of data provided by the GPS 210. The reservation module 402 may be configured to generate a candidate reservation based on the one or more travel routines. For example, the reservation module 402 may generate a reservation at a charging station 112 along a predicted path or routine trip.

The estimation module 404 may be configured to determine a current state of charge (SOC) (e.g., charging level) of the battery 106 of the EV 102. In one configuration, the estimation module 404 may be configured to communicate with the processor 204 of the vehicle computing device 202 to determine the current SOC of the battery 106 of the EV 102. In one embodiment, the processor 204 may be configured to communicate with a micro-processor (not shown) that may be included as part of electrical circuitry of the battery 106 to determine a current SOC of the battery 106. Using the current SOC, the estimation module 404 may also calculate an arrival state of charge of a battery 106 of the EV 102. Accordingly, the estimation module 404 may be configured to determine the SOC of the battery 106 of the EV 102 at one or more points in time based on communication with the processor 204 of the vehicle computing device 202 of the EV 102. Thus, the estimation module 404 may calculate the arrival state of charge is based on the estimated time of arrival and a current state of charge of the battery of the EV 102. The current SOC may initially indicate the SOC at a reservation time when the initial reservation is identified by the reservation module 402. The current SOC may also reflect the current SOC after the reservation time.

Therefore, based on data received from the EV 102, the charging stations 112, the additional electric vehicles 116, the remote server 108 and/or the charging station computing infrastructure 118, the estimation module 404 may calculate the estimated time of arrival for the EV 102 to arrive at the first place at the first time and an arrival state of charge of a battery 106 of the EV at a reservation time. The reservation time may be the time at which the reservation is identified by the reservation module 402. For example, the reservation time may be when the reservation module 402 receives a user 122 selection of a candidate reservation as the initial reservation. The reservation time may be when the initial reservation is confirmed with the charging entity 120. The reservation time may additionally be a predetermined time at which the charging entity 120 processes reservations. For example, the charging entity 120 may process reservation one day before the first time.

The estimation module 404 may be configured to analyze the current geo-location 508 of the EV 102 and determine a remaining distance that the EV 102 is capable of traveling. The remaining distance may be determined based on analyzing the current SOC of the battery 106, an average speed of the EV 102, and/or one or more road types (e.g., local, highway, road grades, road compensation, etc.) that may be located within a vicinity of the current geo-location of the EV 102. The reservation module 402 may use the information from the estimation module 404 to determine which candidate reservations to offer, for example, illustrate on the charging station map user interface 500. Accordingly, the reservation module may generate candidate reservations 502, 504, and/or 506 based on the current and future values estimated by the estimation module 404, such as the current geo-location 508 of the EV 102, the one or more travel routines, the current SOC.

The first candidate reservation 502 and the second candidate reservation 504 are offered with a flexible charger option to indicate that the charging entity 120 may modify the reservation without input or consent from the user 122. The third candidate reservation 506 is a fixed reservation that the charging entity 120 cannot unilaterally change. Accordingly, the third candidate reservation is not offered with a flexible charger option. To persuade the user 122 to select a candidate reservation with a flexible charger option, the compensation module 406 may generate a compensation offer having a user benefit. The reservation module 402 provides the flexible charging option with the compensation offer.

The flexible charger option may be provided at the reservation time when the reservation module 402 generates the candidate reservations 502, 504, and/or 506. Alternatively, as discussed above, the reservation module 402 may provide the flexible charger option based on the candidate reservation 502, 504, and/or 506, for example, based on location. The reservation module 402 may provide the candidate reservations 502, 504, and/or 506 based on the flexible charger option being previously selected by the user 122. For example, the user 122 may select a flexible charger option before selecting the first place and/or the first time. Selecting the flexible charger option may cause the charging station map user interface 500 to be populated with candidate reservations 502, 504, and/or 506 that are subject to the flexible charger option. The flexible charger option is associated with a flexible charger compensation offer with a user benefit. For example, the compensation module 406 may generate a compensation offer having a ubiquitous benefit, such as an incentive pricing scheme, reduced charging rate, money back, free WiFi while charging, among other user benefits.

The incentive pricing schemes may include a price per kilowatt-hour of energy. Because the price of energy may by dynamic, the incentive pricing schemes may include a schedule indicating how the price of energy varies in time. The incentive pricing schemes may be provided by the charging entity 120 to incentivize the user 122 to charge the EV 102 according to a candidate reservation with a flexible charger option. The reservation module may provide candidate reservations with a flexible charger option during an off-peak timeframe where a demand for charging may be below an average amount. For example, the user 122 may tend to charge electric vehicles during hours at night with in-home charging stations (not shown). During these peak timeframes, the charging entity 120 may be charged an increased utility rates that are by the one or more energy providers. Accordingly, the candidate reservation with a flexible charger option may incentivize the user 122 to charge the EV 102 during the day when utility rates are lower.

The flexible charger option may be provided with individual candidate reservations 502, 504, and/or 506. For example, the first candidate reservation 502 may be associated a first flexible charger option 510 and the second candidate reservation 504 may be associated with a second flexible charger option 512, whereas the third candidate reservation 506 may be a fixed reservation 514. Because the first candidate reservation 502 includes first flexible charger option 510, the first candidate reservation 502 may be offered with a specific user benefit. For example, the first candidate reservation 502 may include the user benefit "Gift card to grocery store." Likewise, the second candidate reservation 504 may include the user benefit "Free movie tickets." However, the third candidate reservation 506 is not provided with a compensation offer because it is a fixed reservation. Accordingly, the compensation offer may be specific to the candidate reservation.

The compensation module 406 may tailor the compensation offer to a candidate reservation on the location of the candidate reservation. Continuing the example from above, the compensation module 406 may generate one or more compensation offers with the user benefits for one or more of the candidate reservations 502, 504, or 506. For example, the first candidate reservation 502 may include the user benefit "Gift card to grocery store" because it is near a grocery store. In a similar manner, the compensation module 406 may generate the compensation offer for the second candidate reservation 504 as "Free movie tickets" because it is next to the movie theater. In additional embodiments, the compensation module 406 may generate a compensation offer based on user preferences of the user 122. For example, the user 122 may selectively input threshold preferences related to price schemes, queue/wait times, price incentives, charging types, discounts, and amenities, among others.

The reservation module 402 may generate an initial reservation at the first place and the first time in response to the user 122 selecting a candidate reservation. The candidate reservation may be selected with user input associated with the first flexible charger option 510, the second flexible charger option 512, or the fixed reservation 514. The reservation module 402 may provide the user 122 with the user benefit from the compensation offer at reservation time. For example, suppose the user 122 selects the first flexible charger option 510 associated with the first candidate reservation 502. The reservation module generates the initial reservation based on the first candidate reservation 502. Therefore, the first time may be the arrival time 10:06 AM of the first candidate reservation and the first place will be at the location represented on the charging station map user interface 500 by the first candidate reservation 502. The user 122 is provided with the user benefit, in this example, the gift card to the grocery store based on the first candidate reservation 502.

The estimation module 404 may calculate a first cost for the charging entity 120 associated with the candidate reservations and/or the initial reservation. The first cost may be a value indicating the cost incurred by the charging entity 120 for charging the EV 102 at the first time and/or the first place. The value may be a monetary cost, a resources cost, and/or a score indicative of a cost/benefit analysis of the initial reservation. For example, the first cost may be calculated by the estimation module 404 based on the utility rates that are by the one or more energy providers. Continuing the example from above, the estimation module 404 may calculate the first cost of the first candidate reservation 502 in response to the first flexible charger option 510 being selected. Alternatively, the estimation module 404 may calculate the first cost for each of the candidate reservations 502, 504, and/or 506.

The reservation module 402 may receive reservations from the user 122 directly. For example, the reservation module 402 may receive a reservation from the EV 102 or the portable device 222. In another embodiment, the reservation module 402 may be configured to access the station database 312 stored upon the data store 306 of the remote server 108. The station database 312 may include records that each pertain to particular charging stations 112 that include data that may be pre-updated and/or updated in real-time by charging entity 120. Such records may pertain to particular charging stations 112 and their respective geo-locations. Accordingly, the reservation module 402 may be configured to access and query the station database 312 to identify, manage, and/or modify reservations for one or more charging stations 112. The reservation module 402 may determine the availability of reservations at charging stations 112. For example, the reservation module 402 may determine if a reservation is available at a charging station 112 located within a predetermined distance (e.g., 5 miles) of the current geo-location of the EV 102 or within a predetermined distance of a type of amenity or selected point of interest location in order to generate the candidate reservations.

In some embodiments, the estimation module 404 may additionally or alternatively calculate a grid event cost based on a grid event being detected by a grid event module 408.

The grid event module 408 detects changes to the electrical grid, including the one or more energy providers, the charging station 112, the station computing infrastructure 118, etc. A grid event may include power outage (i.e., a power cut, a power out, a power blackout, a power failure, a power loss, or a blackout), an intentional or unintentional drop in voltage in an electrical power supply system (i.e, brownout), increased demand, peak timeframes, demand spikes, load sharing, capacity, handling failures, and other events that affect the ability of the one or more energy providers to provide energy to the charging entity 120 and/or the user 122. Natural events (e.g., earthquakes, hurricanes, climate change, etc.), physical events (e.g., terrorist attack, infrastructure, breakdown, etc.) and cyber events (e.g., malware, viruses, etc.) that affect the grid may additionally be considered grid events.

The grid event module 408 may detect the grid event by monitoring the frequency, voltage, demand, or capacity, among others at one or more point along the grid, such as at the charging stations 112. The grid event module 408 may also be configured to receive notices of an impending or occurring grid event. The notice may be based on how much warning system operators, of the one or more energy providers, have that a grid event is coming and/or how much of the physical and cyber control systems that make up the electric grid remain operative during the grid event. For example, the one or more energy providers may schedule rolling brownouts that encompass a charging station 112.

Grid events diminish the availability of electricity and or increase the cost of electricity. Accordingly, in response to a grid event being detected by the grid event module 408, the estimation module 404 may estimate the grid event cost of charging the EV 102 according to the initial reservation. For example, the estimation module 404 estimate the first cost that the charging entity 120 will incur to provide the charge to the EV 102 at the first time and the first place at a reservation time when the reservation is made. At a later time, the estimation module 404 may estimate the grid event cost that the charging entity 120 will incur to provide the charge to the EV 102 in response to detecting the grid event. The grid event may cause the first cost to increase to the grid event cost for the charging entity 120.

Further in response to the grid event module 408 detecting grid event, the reservation module 402 may generate a revised reservation for the EV 102. The revised reservation is associated with a second cost for the charging entity 120 that is less than the first cost and/or the grid event cost. For example, the reservation module 402 may identify a number of available reservations commensurate with the estimated time of arrival for the EV 102 to arrive at the first place at the first time and/or the arrival SOC of a battery 106 of the EV 102. The estimation module 404 may estimate a grid event cost that the charging entity 120 will incur to provide the charge to the EV 102. The estimation module 404 may estimate the grid event cost in response to the grid event module 408 detecting a grid event and/or the reservation module 402 generating a revised reservation.

The reservation module 402 may select a revised reservation from the number of available reservations that have a second cost that is lower cost than the first cost and/or the grid event cost. For example, the reservation module 402 may select a revised reservation because it is associated with the lowest cost relative to the first cost and/or the increased first cost. As another example, the reservation module 402 may select the revised reservation because it is the closest in time or distance to the first time and the first distance of the initial reservation. The reservation module 402 may select the revised reservation based on preferences of the user 122, for example, for a specific type or amount of user benefit of the compensation offer. In this manner, if the charging entity 120 is able to find a reservation that is more cost effective than the first cost or the grid event cost, the initial reservation can be revised.

The revised reservation may include second place and/or a second time for the EV 102 to receive the charge. The second place may be a different charging station at the same location, a separate location, or separate source. For example, returning to FIG. 5, the reservation module 402 may identify the second candidate reservation 504 as the first revised reservation. The second cost of the revised reservation may be based on the second time and/or the second place. For example, the first second place may include a specific charging station 112 where the EV 102 is to be charged. Alternatively, the second place may allow the EV 102 to charge from a second source such as the additional vehicle 116. The second place may be GPS/DGPS coordinates, a location associated with a charging station 112 such as a store front, restaurant, movie theater, one or more perspective pathways of the EV 102, and/or one or more points of interest. The second place may be located at a variable distance from the current geo-location of the EV 102 and/or one or more perspective travel paths of the EV 102. Thus, the revised reservation may be based on a distance between the first place and the second place or a duration between the first time and the second time.

The update module 410 is configured to update the initial reservation to the revised reservation. The update module 410 may update the initial reservation to the revised reservation without user input or consent. The initial reservation may be updated to reflect details of the revised reservation. For example, the initial reservation may be modified to reflect the second place and/or the second time of the revised reservation. Continuing the example from above, the revised reservation is generated based on the second candidate reservation 504 instead of the first candidate reservation 502 that the initial reservation was based on.

Updating the initial reservation to a revised reservation may include altering a calendar of the user 122. Suppose that the initial reservation is associated with an appointment on the user's calendar. The update module 410 may cause the appointment to be altered with the second place or the second time rather than the first place or the first time of the initial reservation. For example, the user 122 may maintain a digital calendar that includes an appointment for the initial reservation. The update module 410 may include updating the appointment to the second place and/or the second time, for example, via the remote server 108. Updating the initial reservation to the revised reservation may include modifying the initial reservation with the second place and/or the second time. Alternatively, updating the initial reservation to the revised reservation may include cancelling the initial reservation, such that the appointment associated with the initial reservation may be removed from the calendar.

Figure 6:
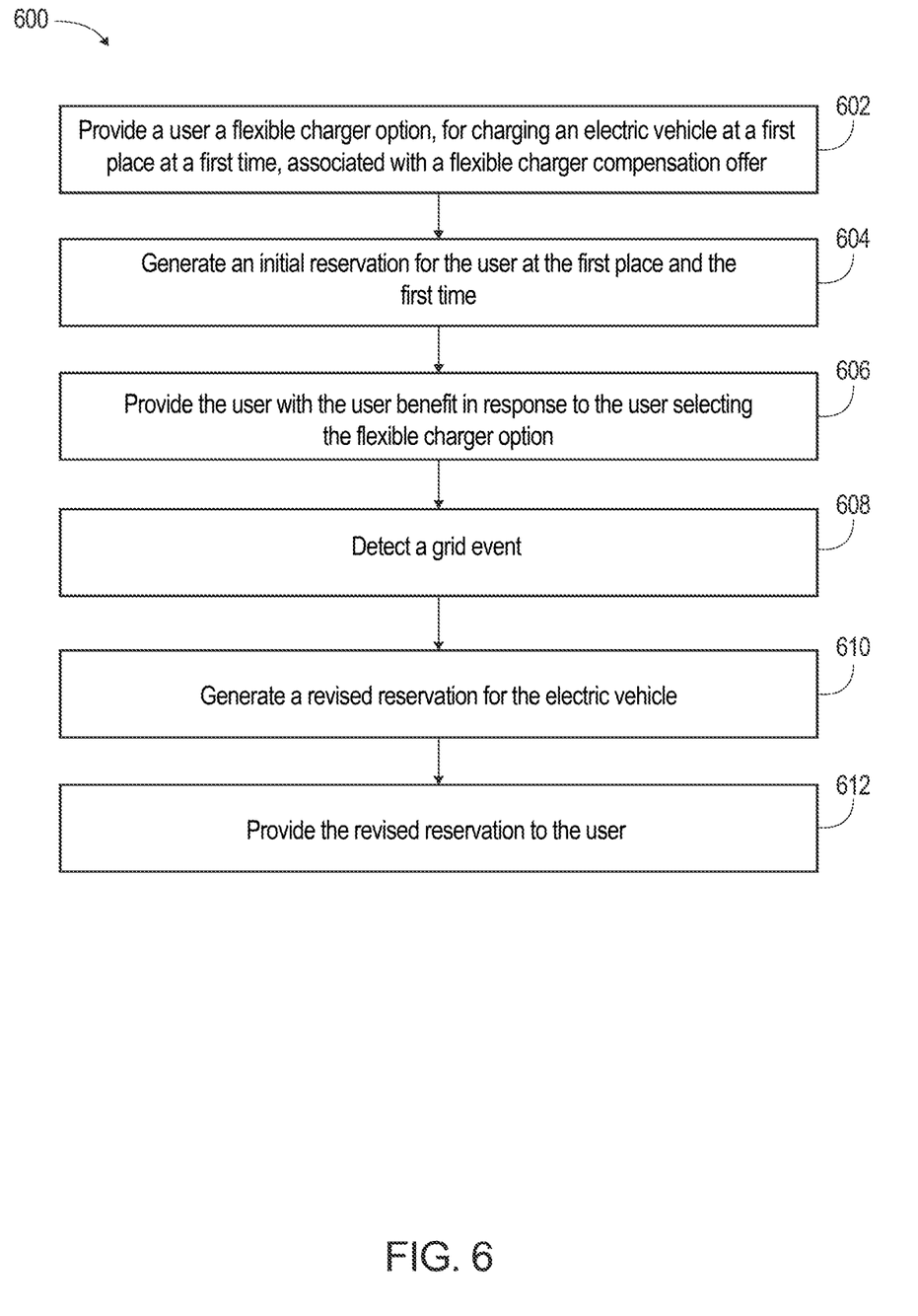
FIG. 6 is a process flow diagram of a method for flexible charger reservations according to an exemplary embodiment.

FIG. 6 is a process flow diagram of a method 600 for flexible charger reservations according to an exemplary embodiment of the present disclosure. FIG. 6 will be described with reference to the components of FIGS. 1-5, through it is to be appreciated that the method 600 of FIG. 6 may be used with additional and/or alternative system components.

At block 602, the method 600 includes the reservation module 402 providing a user 122 a flexible charger option for charging the EV 102 at a first place at a first time. The flexible charger option may be provided to the user 122 as a series of candidate reservations 502, 504, and/or 506. In one embodiment the reservation module 402 may present the candidate reservations 502, 504, and/or 506 on a charging station map interface 500 through the display 218 of the EV 102 and/or through the display of the portable device 222. The charging station map interface may be presented as a map that may pin point one or more charging stations 112 that may be determined to be within the predetermined distance of the EV 102, as determined by the estimation module 404. Additionally, the charging station map user interface 500 may include selection inputs, such as the first flexible charger option 510, the second flexible charger option 512, and/or the fixed reservation 514.

The flexible charger option is associated with a flexible charger compensation offer including a user benefit. The compensation offer may be the same for a plurality of the candidate reservations 502, 504, and/or 506 or specific to each candidate reservations 502, 504, and/or 506. The compensation offer may be a reduced rate for the user to charge the EV 102. Additionally or alternatively, the initial compensation offer may include other user benefits such as coupons, discounts, access to amenities, and other valuables.

At block 604, the method 600 includes generating an initial reservation for the user 122 at the first place and the first time. The initial reservation is associated with a first cost for the charging entity 120. The first cost is estimated by the estimation module 404 and may be based on the cost of energy at a reservation time, for example, the time when the initial reservation is generated.

At block 606, the method 600 includes providing the user 122 with the user benefit in response to the user 122 selecting the flexible charger option. For example, suppose that the user selects the first candidate reservation 502. The reservation module 402 or the compensation module 406 may provide the user with the user benefit associated with the first candidate reservation 502, here the gift card to the grocery store. The user 122 may be provided with the gift card as an electronic gift card via electronic mail, text message, short message service (SMS) message, etc. that can be received, for example, through the display 218 of the EV 102 and/or through the display of the portable device 222. The user benefit may also be provided to the user as a coupon code, digital tickets, etc.

At block 608, the method 600 includes detecting a grid event that changes the first cost for the charging entity 120. For example, the grid event module 408 may receive a notification that the electrical grid will experience a grid event at a predetermined time. In some embodiments, the grid event module 408 may determine that the predetermined time falls within the first time of the initial reservation.

At block 610, the method 600 includes the reservation module 402 generating a revised reservation for the EV 102 associated with a second cost. For example, in response to determining that the predetermined time of the grid event falls within the first time of the initial reservation, the reservation module 402 may generate a revised reservation at a second time, having duration that does not overlap the predetermined time of the grid event. Because the second time of the revised reservation ensures that the EV 102 will not be charged during the grid event, stress and/or demand on the electrical grid may be reduced.

The second cost is calculated for the revised reservation, and thus, is based on the second place and/or the second time. Therefore, the second cost to the charging entity 120 is lower for the revised reservation as compared to the first cost associated with the initial reservation.

At block 612, the method 600 includes the update module 410 updating the initial reservation to the revised reservation. The update module 410 may communicate with the charging station 112 with the revised reservation. The update module 410 may also provide the revised reservation to the user 122. The revised reservation may be provided to the display 218 of the EV 102 and/or the portable device 222 of the user 122. In some embodiment, the update module 410 may modify the initial reservation to reflect the revised reservation on a calendar of the user 122.

By virtue of the systems and methods described herein, the charger reservations are flexible in that that initial reservation can be modified to be a revised reservation without input from the user 122. Therefore, the systems and methods described herein, facilitate the charging entity 120 to determine cost savings associated with modifying reservations for charging the EV 102. Furthermore, to persuade the user 122 to accept a revised reservation a compensation offer may be presented to the user. Accordingly, the reservations are flexible and can be changed by the charging entity 120 to manage demand on the grid. This can reduce stress on the infrastructure caused by high demand. In another embodiment, the charging entity 120 can better manage the cost of charging the EV 102. Accordingly, the flexible charger reservations improve the functioning of the electrical grid and infrastructure and improve the business model of the charging entity 120.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein.

A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for flexible charger reservations, comprising:
communicating with an electric vehicle and a charging entity over a network;
providing, from the charging entity, a user a fixed charger option and a flexible charger option for charging the electric vehicle at a first place at a first time, wherein each of the fixed charger option and the flexible charger option is provided to user for selection via a charging station map user interface of a display of the electric vehicle, the flexible charger option is associated with a flexible charger compensation offer including a user benefit;
calculating an estimated time of arrival for the electric vehicle to arrive at the first place at the first time by determining a current geo-location of the electric vehicle via a position determination device of the electric vehicle and an arrival state of charge of a battery of the electric vehicle at the first time;
generating an initial reservation for the user at the first place and the first time, wherein the initial reservation is associated with a first cost for the charging entity, wherein the charging station map user interface pinpoints on the display a geo-location of the initial reservation;
providing the user with the user benefit in response to the user selecting the flexible charger option via the charging station map user interface and tailoring the user benefit based on user preferences and the geo-location of the electric vehicle;
detecting a grid event that changes the first cost for the charging entity;
generating a revised reservation for the electric vehicle based on the grid event, wherein the revised reservation is associated with a second cost for the charging entity that is less than the first cost, wherein the charging station map user interface pinpoints on the display a geo-location of the revised reservation if different from the initial reservation; and
providing the revised reservation to the user via the charging station map user interface,
wherein selecting the flexible charger option provides the charging entity with consent to unilaterally alter the initial reservation to the revised reservation.

2. The computer-implemented method of claim 1, wherein the revised reservation includes a second place or a second time for the electric vehicle to receive a charge.

3. The computer-implemented method of claim 2, further comprising:
estimating the second cost that the charging entity will incur to provide the charge to the electric vehicle from electrical infrastructure in response to detecting the grid event, wherein the second cost is based on the second time or the second place.

4. The computer-implemented method of claim 2, wherein the user is associated with a calendar including an appointment for the initial reservation, and wherein updating the initial reservation to the revised reservation includes causing the calendar to alter the appointment with the second place or the second time.

5. The computer-implemented method of claim 1, wherein the initial reservation is generated at a reservation time and the user benefit is provided to the user at the reservation time.

6. The computer-implemented method of claim 1, wherein the revised reservation cancels the initial reservation.

7. A system for flexible charger reservations, comprising:
an electric vehicle having a charging station map user interface presented through a display:
a charging entity operably connected for computer communication the electric vehicle;
a charging station computing infrastructure including a memory storing instructions when executed by a processor cause the processor to:
communicate with the electric vehicle and the charging entity over a network;
provide, from the charging entity, the user a fixed charger option and a flexible charger option for charging the electric vehicle at a first place at a first time, wherein each of the fixed charger option and the flexible charger option is provided to user for selection via the charging station map user interface, the flexible charger option is associated with a flexible charger compensation offer including a user benefit;

calculate an estimated time of arrival for the electric vehicle to arrive at the first place at the first time by determining a current geo-location of the electric vehicle via a position determination device of the electric vehicle and an arrival state of charge of a battery of the electric vehicle at the first time;

generate an initial reservation for the user at the first place and the first time, wherein the initial reservation is associated with a first cost for the charging entity, wherein the charging station map user interface pinpoints on the display a geo-location of the initial reservation;

provide the user with the user benefit in response to the user selecting the flexible charger option via the charging station map user interface and tailor the user benefit based on user preferences and the geo-location of the electric vehicle;

detect a grid event that changes the first cost for the charging entity;

generate a revised reservation for the electric vehicle based on the grid event, wherein the revised reservation is associated with a second cost for the charging entity that is less than the first cost, wherein the charging station map user interface pinpoints on the display a geo-location of the revised reservation if different from the initial reservation; and provide the revised reservation to the user via the charging station map user interface, wherein selecting the flexible charger option provides the charging entity with consent to unilaterally alter the initial reservation to the revised reservation.

8. The system of claim 7, wherein the revised reservation includes a second place or a second time for the electric vehicle to receive a charge.

9. The system of claim 8, wherein the memory storing instructions when executed by the processor further causes the processor to:

estimating the second cost that the charging entity will incur to provide the charge to the electric vehicle from electrical infrastructure in response to detecting the grid event, wherein the second cost is based on the second time or the second place.

10. The system of claim 8, wherein the user is associated with a calendar including an appointment for the initial reservation, and wherein updating the initial reservation to the revised reservation includes causing the calendar to alter the appointment with the second place or the second time.

11. The system of claim 7, wherein the initial reservation is generated at a reservation time and the user benefit is provided to the user at the reservation time.

12. The system of claim 7, wherein the revised reservation cancels the initial reservation.

13. A non-transitory computer readable storage medium storing instructions that when executed by a computer, which includes a processor perform a method, the method comprising:

communicating with an electric vehicle and a charging entity over a network;

providing, from the charging entity, a user a fixed charger option and a flexible charger option for charging the electric vehicle at a first place at a first time, wherein each of the fixed charger option and the flexible charger option is provided to user for selection via a charging station map user interface of a display of the electric vehicle, the flexible charger option is associated with a flexible charger compensation offer including a user benefit;

calculating an estimated time of arrival for the electric vehicle to arrive at the first place at the first time by determining a current geo-location of the electric vehicle via a position determination device of the electric vehicle and an arrival state of charge of a battery of the electric vehicle at the first time;

generating an initial reservation for the user at the first place and the first time, wherein the initial reservation is associated with a first cost for the charging entity, wherein the charging station map user interface pinpoints on the display a geo-location of the initial reservation;

providing the user with the user benefit in response to the user selecting the flexible charger option via the charging station map user interface and tailoring the user benefit based on user preferences and the geo-location of the electric vehicle;

detecting a grid event that changes the first cost for the charging entity;

generating a revised reservation for the electric vehicle based on the grid event, wherein the revised reservation is associated with a second cost for the charging entity that is less than the first cost, wherein the charging station map user interface pinpoints on the display a geo-location of the revised reservation if different from the initial reservation; and providing the revised reservation to the user via the charging station map user interface, wherein selecting the flexible charger option provides the charging entity with consent to unilaterally alter the initial reservation to the revised reservation.

14. The non-transitory computer readable storage medium of claim 13, wherein the revised reservation includes a second place or a second time for the electric vehicle to receive a charge.

15. The non-transitory computer readable storage medium of claim 14, further comprising:

estimating the second cost that the charging entity will incur to provide the charge to the electric vehicle from electrical infrastructure in response to detecting the grid event, wherein the second cost is based on the second time or the second place.

16. The non-transitory computer readable storage medium of claim 14, wherein the user is associated with a calendar including an appointment for the initial reservation, and wherein updating the initial reservation to the revised reservation includes causing the calendar to alter the appointment with the second place or the second time.

17. The non-transitory computer readable storage medium of claim 13, wherein the revised reservation cancels the initial reservation.

* * * * *